United States Patent [19]
Federico

[11] 3,899,962
[45] Aug. 19, 1975

[54] PASTRY BAKING APPARATUS

[76] Inventor: Arthur Federico, 4 Explorer Rd., Brigantine, N.J. 08203

[22] Filed: Jan. 24, 1974

[21] Appl. No.: 436,106

[52] U.S. Cl. ................... 99/447; 99/430; 99/450
[51] Int. Cl. .............................. A47j 37/01
[58] Field of Search ............... 99/447, 339–340, 99/389, 401, 430, 433, 446, 450; 126/25, 273–274, 376–377; 220/23.4, 23.8

[56] References Cited
UNITED STATES PATENTS

| | | | |
|---|---|---|---|
| 77,884 | 5/1868 | Isham | 99/340 |
| 178,144 | 5/1876 | Harris | 99/450 |
| 305,343 | 9/1884 | Siegenthaler | 99/450 |
| 895,657 | 8/1908 | Moll | 99/450 |
| 961,474 | 6/1910 | Allsopp | 99/450 UX |
| 1,124,363 | 1/1915 | Valentine | 99/430 |
| 1,756,558 | 4/1930 | Katzinger | 99/450 |
| 1,995,515 | 3/1935 | Matassa | 99/430 X |
| 2,514,845 | 7/1950 | Collins | 99/430 |
| 3,599,558 | 8/1971 | Goldberg | 99/339 |

Primary Examiner—Harvey C. Hornsby
Assistant Examiner—Arthur O. Henderson

[57] ABSTRACT

This invention is directed to composite baking apparatus designed to receive baked "pizza" pie crust, and after a filling or topping has been supplied to it as in the making of pastries such as "pizza pie", to support it in a baking oven while the filling is being cooked and is particularly characterized by a grid or tray element adapted to rest on a frame having a raised peripheral flange and to receive the crust on reticulated or discontinuous supporting means which inhibits entrapment of air in confined cells between the crust and the underlying oven floor, thus enhancing the uniformity of heat transfer to the pastry together with means embodied in the tray element and frame for facilitating the severing of the pastry into sections of serving size, the sheet and tray normally being so dimensioned as to accomodate a pastry of sufficient size to enable a numer of serving size pieces to be made from it, and usually although not necessarily, rectangular in general outline.

1 Claim, 4 Drawing Figures

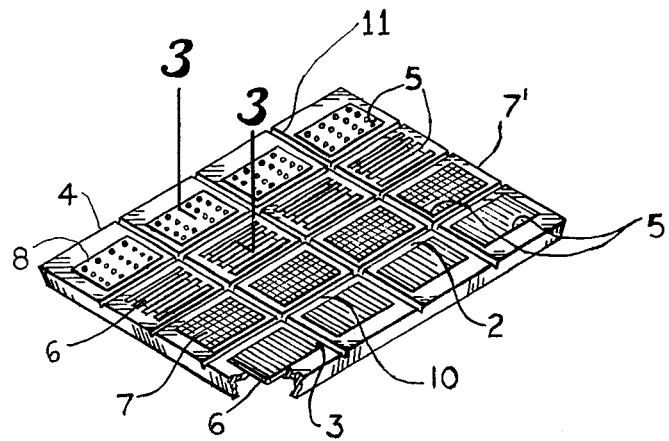
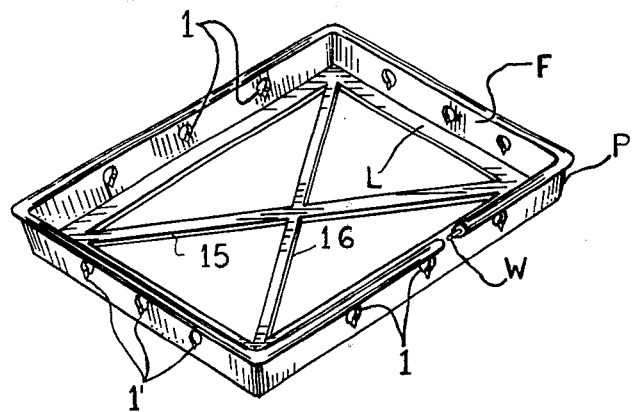
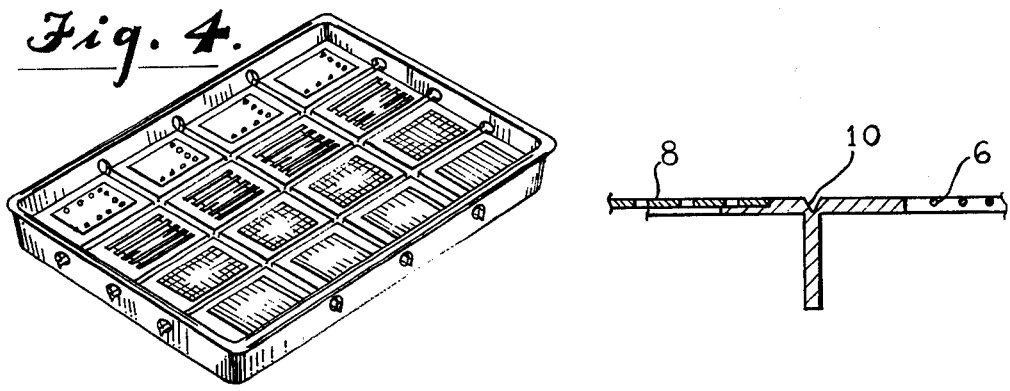

PASTRY BAKING APPARATUS

THE PRIOR ART

It has heretofore been customary to bake rolled out pastry dough on flat sheet-metal pans or baking sheets, the dough usually being perforated at intervals to allow for the escape of trapped air or steam to minimize "blisters" or the like which prevent full contact between the dough and the pan which result in undulations in the crust. The baked crust in which such undulations occur does not uniformly contact a baking sheet in which it is later disposed to receive the filling for baking of the latter, so that some portions of the pastry may be overcooked while the other portions may not be cooked enough.

There has been suggested as in U.S. Pat. No. 1,124,363 dated Jan. 12, 1915 a biscuit mold or tray made of complementary sections composed largely of perforated sheet metal, and divided into cells having peripheral cutting edges for dividing the dough into individual biscuits.

So far as I know, none of such baking pans or molds for biscuits has ever been made or offered to the public and I am aware of no other receptacle for pastry or the like which provides discontinuous supporting means for a pastry crust which allows the pastry to be cooked uniformly throughout its area in a baking oven or the like irrespective of undulations of other dimensional irregularities that may be present in the crust.

SUMMARY OF THE INVENTION

The present invention, however, is directed to composite baking apparatus comprising a frame having a peripheral flange, and a removable grid or tray element adapted for disposition in it and providing discontinuous supporting means for individual portions of a pastry crust, separated by relatively narrow ribs having guiding slots or grooves therein to facilitate dividing the pastry into individual serving size pieces of peripheral contour generally corresponding to cells defined by the grid.

THE DRAWING

A preferred embodiment of the invention is illustrated in the accompanying drawing, in which FIG. 1 is a fragmentary perspective view of the grid or tray element to which reference has been made;

FIG. 2 is a perspective view of the frame designed to receive the tray prior to disposition on the latter of a pastry crust;

FIG. 3 is an enlarged fragmentary section on the line 3—3 in FIG. 1 and

FIG. 4 is a perspective view on a reduced scale of the frame and tray assembled in readiness for use.

DESCRIPTION OF THE PREFERRED EMBODIMENT

Referring now more particularly to the drawing, the frame F in this instance generally rectangular in external contour, will be recognized as being substantially similar to the peripheral portions of baking sheets heretofore in general use and comprising an angularly upstanding flange F' the upper edge of which is rolled about a wire W in accordance with the usual practice in the manufacture of baking sheets and pans. The flange, however, in accordance with the invention is interrupted by spaced guide holes 1 at intervals longitudinally of the flange; their function will hereafter more fully appear. Within this flange is an integral inwardly directed rib or ledge L on which is disposed the grid or tray element now to be described, when the parts are assembled.

The tray element T comprises a grid consisting of longitudinal ribs 2 and transverse ribs 3 which may be integral, as when the grid is formed by molding or casting, or it may be constructed of preformed components held in assembled relation by any convenient or suitable means, (not shown) for example, by welding or the like. A peripheral angle beam 4 frames the ends of the ribs and holds them together, having its included angle complementary to the angle between the flange F' and ledge L of frame F.

The ribs and peripheral beam 4 define individual preferably rectangular cells 5, across each of which there is extended pastry supporting means secured to the grid, either as transverse or longitudinal wires 6, wire cloth or screening 7, or perforated sheet metal 8. It will be understood that while I have illustrated the supporting means in the cells as several specifically different structures in one grid, ordinarily only one type or style will be employed in each grid so all the cells will be substantially identical. Preferably the upper surfaces of the supporting means, of whatever specific character, lie in the same plane as the upper surfaces of the ribs 2, 3 and beam 4 to facilitate removal of the pastry after baking.

In each case, however, ribs 2 are provided with center-line V-shaped grooves 10 while ribs 3 have substantially similar grooves 11 along their center lines, grooves being preferably omitted from beam 4, although if provided they facilitate separation of the edge of the crust from the filled pastry.

The several grooves 10, 11 are aligned, when the grid tray is disposed in the frame, respectively with the guide holes 1 in flange F', and the latter then facilitate locating the grooves when these are obscured by the pastry crust.

Further to facilitate positioning a cutting blade in alignment with grooves 10, 11 the holes 1 communicate with V-shaped notches 1' aligned respectively with the V-shaped grooves 10, 11 in the ribs. This enables a cutting blade to be properly aligned with the grooves for cutting the pastry into serving size pieces of uniform shape and dimensions and allows the point of a cutting blade to extend through the frame flange to insure cutting of the crust at its very edge.

It will be recognized that when my composite baking apparatus is employed for baking pizzas or other pastry, the pastry crust is deposited on the tray T in the frame F and held spaced from contact with the oven floor by the grid ribs 2, 3 and supporting means 6, 7 or 8 as the case may be. The frame F' in turn is normally in contact with the oven floor as are reinforcing elements 15, 16 which may be provided to stiffen and reinforce the frame if desired, although conducting little heat to the tray but by inhibiting entrapment of air or steam beneath the pastry crust in pockets the construction of the apparatus insures uniform heat transfer from the oven floor, or subjacent heating means to the crust, for cooking the pastry precisely uniformly throughout and to the desired extent on all occasions.

Hence, standard conditions for reproducing identical pastries can be established without requiring frequent examination of the pastry during baking, while subdividing it into serving size pieces after baking is facilitated due to the grooves 10, 11 insuring identical pieces being offered to consumers.

I claim:

1. Pastry baking apparatus comprising a substantially rectangular frame element having a raised peripheral flange provided with longitudinally spaced openings, an inwardly directed ledge and integral reinforcing elements extending diagonally between opposite corners of the frame element, and a tray element substantially coextensive with the frame element adapted to be disposed within said peripheral flange providing a plurality of substantially identical rectangular cells separated by elongated ribs having substantially V-shaped longitudinal grooves in their upper surfaces aligned with said flange openings when the tray element is disposed within said flange and reticulate pastry supporting means extending across said cells (between) and connected with said ribs for supporting pastry in uniformly spaced relation to said frame element.

* * * * *